US010745126B2

(12) United States Patent
Molnar et al.

(10) Patent No.: US 10,745,126 B2
(45) Date of Patent: Aug. 18, 2020

(54) UNMANNED AERIAL SYSTEM WITH TRANSPORTABLE SCREEN

(71) Applicant: WET, Sun Valley, CA (US)

(72) Inventors: Dezso Molnar, Sun Valley, CA (US); John Canavan, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 15/393,118

(22) Filed: Dec. 28, 2016

(65) Prior Publication Data

US 2017/0240279 A1 Aug. 24, 2017

Related U.S. Application Data

(60) Provisional application No. 62/271,668, filed on Dec. 28, 2015.

(51) Int. Cl.

| | |
|---|---|
| ***B64C 39/02*** | (2006.01) |
| ***G03B 21/608*** | (2014.01) |
| ***G03B 21/00*** | (2006.01) |
| ***G03B 21/56*** | (2006.01) |
| ***B05B 17/08*** | (2006.01) |
| ***B64D 1/22*** | (2006.01) |
| ***B64D 47/08*** | (2006.01) |
| ***H04N 5/232*** | (2006.01) |
| ***H04N 7/18*** | (2006.01) |
| ***H04N 9/31*** | (2006.01) |

(52) U.S. Cl.

CPC ............ *B64C 39/024* (2013.01); *B05B 17/08* (2013.01); *B64D 1/22* (2013.01); *B64D 47/08* (2013.01); *G03B 21/00* (2013.01); *G03B 21/56* (2013.01); *G03B 21/562* (2013.01); *G03B 21/608* (2013.01); *H04N 5/23293* (2013.01); *H04N 7/181* (2013.01); *H04N 9/3147* (2013.01); *B64C 2201/12* (2013.01); *B64C 2201/127* (2013.01)

(58) Field of Classification Search

CPC ................................ G03B 21/60; G03B 21/00
USPC .......................................................... 239/18
See application file for complete search history.

(56) References Cited

U.S. PATENT DOCUMENTS

| | | | |
|---|---|---|---|
| 3,503,574 | A | 3/1970 | Eickmann |
| 4,010,619 | A | 3/1977 | Hightower et al. |
| 5,293,304 | A | 3/1994 | Godfrey |
| 5,769,359 | A | 6/1998 | Rutan et al. |

(Continued)

FOREIGN PATENT DOCUMENTS

| | | |
|---|---|---|
| CN | 103241377 | 8/2013 |
| CN | 203294314 | 11/2013 |

(Continued)

OTHER PUBLICATIONS

Vila, Oscar; [Power Electronics 01] Design of the Power Electronics of a Tethered UAV; Master Thesis; Bio, Electro and Mechanical Systems, http://beams.ulb.ac.be/student-projects; Oct. 20, 2014; 2 pages.

(Continued)

*Primary Examiner* — Clifford Hilaire
(74) *Attorney, Agent, or Firm* — Maceiko IP

(57) ABSTRACT

An unmanned aerial system (UAS) that displays an image, video or other effect is described. The UAS may include a camera that captures the image for display. The UAS may be used in connection with a water display, and multiple UASs may operate together.

20 Claims, 16 Drawing Sheets

10A
10B
11A
11B
400
502

(56) References Cited

U.S. PATENT DOCUMENTS 6,200,185 B1 3/2001 Kuster, Jr.
6,270,038 B1 8/2001 Cycon et al.
6,547,180 B1 4/2003 Cassidy
6,575,402 B1 6/2003 Scott
6,749,154 B1 6/2004 Johnson
6,933,965 B2 8/2005 Heafitz
7,055,994 B2 6/2006 Martin
7,082,706 B1 8/2006 Stinis et al.
7,249,732 B2 7/2007 Sanders et al.
7,324,016 B1 1/2008 Milgram
7,414,546 B2 8/2008 Singer et al.
7,472,866 B2 1/2009 Heaston et al.
7,631,834 B1 12/2009 Johnson et al.
7,668,403 B2 2/2010 Kanowitz
8,056,461 B2 11/2011 Bossert et al.
8,091,822 B2 1/2012 Boyce
8,100,649 B2 1/2012 Okimura
8,109,711 B2 2/2012 Blumer et al.
8,123,460 B2 2/2012 Collette
8,157,383 B2 4/2012 Scanlon
8,369,399 B2 2/2013 Egnal et al.
8,434,920 B2 5/2013 Jones
8,511,818 B2 8/2013 Fuller et al.
8,554,395 B2 10/2013 Andersson
8,567,718 B1 10/2013 McDonnell
8,596,572 B1 12/2013 Kirshman et al.
8,600,602 B1 12/2013 McAndrew et al.
8,646,719 B2 2/2014 Morris et al.
8,777,157 B2 7/2014 Barrett et al.
8,825,225 B1 9/2014 Stark et al.
8,862,285 B2 10/2014 Wong et al.
9,169,030 B2 10/2015 Wong et al.
9,174,733 B1 11/2015 Burgess et al.
10,364,026 B1 7/2019 Hanlon et al.
10,384,777 B1 8/2019 Welsh
2002/0049728 A1* 4/2002 Kaku ................ G06F 17/30259
2002/0171927 A1 11/2002 Barnes
2004/0020999 A1 2/2004 Beidokhti
2005/0146884 A1 7/2005 Scheithauer
2005/0219479 A1 10/2005 Mugrauer
2006/0140644 A1 6/2006 Paolella
2008/0165547 A1 7/2008 Amor et al.
2008/0313937 A1 12/2008 Boyce
2010/0027281 A1 2/2010 Waters et al.
2011/0180667 A1 7/2011 O'Brien et al.
2012/0044710 A1 2/2012 Jones
2012/0056041 A1 3/2012 Rhee et al.
2012/0112008 A1 5/2012 Holifield et al.
2012/0153087 A1 6/2012 Collette
2012/0200703 A1 8/2012 Nadir et al.
2012/0250335 A1 10/2012 Nakano
2013/0062457 A1 3/2013 Deakin
2013/0077330 A1 3/2013 Hessling
2013/0134254 A1 5/2013 Moore
2013/0233964 A1 9/2013 Woodworth et al.
2013/0248097 A1 9/2013 Ploss, Jr.
2013/0314502 A1 11/2013 Urbach et al.
2014/0002990 A1 1/2014 Sharma et al.
2014/0018976 A1 1/2014 Goossen et al.
2014/0131510 A1 5/2014 Wang et al.
2014/0217242 A1 8/2014 Muren et al.
2014/0231590 A1 8/2014 Trowbridge et al.
2014/0233099 A1 8/2014 Stark et al.
2014/0236388 A1* 8/2014 Wong .................... B64C 39/024
701/2
2014/0257595 A1 9/2014 Tillmann
2014/0263852 A1 9/2014 Walker et al.
2014/0268838 A1 9/2014 Kimball et al.
2014/0374535 A1 12/2014 Wong et al.
2015/0129716 A1 5/2015 Yoffe
2015/0154890 A1* 6/2015 Savitsky .............. G09B 23/286
434/267
2015/0329218 A1 11/2015 McDonnell et al.
2015/0362917 A1 12/2015 Wang et al.
2016/0033855 A1* 2/2016 Wong ..................... G03B 37/00
353/13
2016/0041628 A1* 2/2016 Verma .................. G06F 3/0304
345/156
2016/0068266 A1 3/2016 Carroll
2016/0200437 A1 7/2016 Ryan et al.

FOREIGN PATENT DOCUMENTS

DE 20 2009 017291 3/2010
JP 2012-190557 10/2012
JP 2013-211200 10/2013
KR 10-2008-0074045 8/2008
KR 10-2010-0041367 4/2010
KR 10-2011-0090231 8/2011
WO WO 2002-044809 6/2002
WO WO 2006-016018 2/2006
WO WO 2007-141795 12/2007
WO WO 2013-162128 10/2013

OTHER PUBLICATIONS

Eurolink Systems; Cobra—Micro Tethered Surveillance; ERMES by EuroLink Systems, Ermes Technologies; Oct. 21, 2014, 3 pages.

Finch, Andy and Ballew, Eric; Direct Spray Cooling and System-Level Comparisons; Electronics Cooling Magazine; www.electronics-cooling.com; Aug. 1, 2009; 5 pages.

Staes, Patrick; Drone @ Work; Aerial Imaging and Filming; http://drone-at-work.com; Oct. 21, 2014, 6 pages.

Quick, Darren; CyPhy Works' UAVs Use Ground-Based Power to Stay Aloft Indefinitely; www.gizmag.com, Dec. 5, 2012, 4 pages.

Burkhart, Ford; DSS 2013: Tiny Drone Flies on Fiber-Optic Power; the business of photonics optics.org; http://optics.org/news; May 2, 2013; 2 pages.

LEDs Magazine; Oxley Supplies LED Lights to BAE Unmanned Air Vehicle; www.ledsmagazine.com; Oct. 17, 2014; 11 pages.

"Heat Transport by Radiation", U.S. Appl. No. 14/922,061, filed Feb. 9, 2017 Office Action, dated May 2010, 3 pages.

Lai, Yan, et al., "Liquid Cooling of Bright LEDs for Automotive Applications", 2009, Applied Thermal Engineering 29 (2009), pp. 1239-1244, U.S. Appl. No. 14/922,061, filed Feb. 9, 2017 Office Action.

PCT, International Search Report and Written Opinion of the International Searching Authority, PCT/US2015/057249, dated Feb. 17, 2016, 10 pages.

"Phantom 2 User Manual V1.1," Apr. 30, 2014, 2013-2014 DJI Innovations, 34 pages, U.S. Appl. No. 14/922,061, filed Feb. 9, 2017 Office Action.

"Spreading Wings S900 User Manual", Aug. 2014, 2014 DJI, 32 pages, U.S. Appl. No. 14/922,061, filed Feb. 9, 2017 Office Action.

Wang, Ruishan, et al., "A Cooling System with a Fan for Thermal Management of High-Power LEDs", Aug. 2010, J. Mod. Phys., 2010, 1, pp. 196-199, U.S. Appl. No. 14/922,061, filed Feb. 9, 2017 Office Action.

* cited by examiner

UNMANNED AERIAL SYSTEM WITH TRANSPORTABLE SCREEN

CROSS REFERENCE TO RELATED APPLICATIONS

This application claims the benefit of U.S. Provisional Application No. 62/271,668, filed Dec. 28, 2015, the contents of which are incorporated herein by reference.

FIELD OF THE INVENTION

The field of the invention generally relates to unmanned aircraft systems (UASs), including UASs that may transport a screen, banner, display or other similar device.

BACKGROUND OF THE INVENTION

In recent years, UASs have been developed and put into use in different applications. Besides UASs such as large drones used in military applications, smaller consumer-level UASs have recently become more popular in civilian applications due to their ease of use. For example, smaller self-stabilizing UASs are now commonly used by aviation enthusiasts with little or no flight training, similar to how small-scale airplanes and helicopters have been used by skilled hobbyists for some time.

More recently, UASs have been used as display items, to carry objects and serve other functions. For example, UASs have been fitted with lights and flown in formation under computer control by the Austrian group Ars Electronica in 2012 to provide a visual display where the positions of the lights may be varied. As another example, U.S. Publication No. 2014/0236388 by Disney Enterprises, discloses the use of lighted UASs that fly under computer control. In this application, the lighted UASs are referred to as flying lanterns or flying pixels (flixels).

It has also been recently suggested that UASs may be used to transport a screen onto which an image may be projected. This is shown in U.S. Publication No. 2014/0233099 by Disney Enterprises where ground-based projectors shine light onto screens held aloft by UASs.

However, it may be difficult to project an image from the ground onto a screen held aloft, for example, in windy conditions if the screen is unstable. In addition, the scope of a UAS's flight pattern may be significantly restricted due to the limited range of the projected images. Accordingly, there is a need for an improved display screen that may be held aloft by one or more UAS(s).

There has also been disclosure of the use of LED screens on the sides of aircraft such as blimps. However, the areas in which blimps may fly is limited given their significant size. Indeed, it would be impracticable to fly a blimp into a relatively small or tight airspace. Accordingly, there is a need for a flying vehicle that may provide a display screen in relatively small airspaces so that, for example, the screen may be included in a water and light show or other form of entertainment.

In addition, due to the complexity and generally large size of modern water and light shows, it may be difficult for audience members to have a full view of all of the various elements that the water display may offer for enjoyment. And while ground based camera and display systems may provide some additional views to some of the audience members, it may be very difficult for these systems to adequately capture images and video from elevated vantage points and adequately display them to the audience below. There is therefore a need for an improved system that may be elevated to capture images and video from previously unachievable vantage points and display them to the audience below to enjoy.

SUMMARY OF THE INVENTION

In a first aspect of the invention, a system wherein one or more UASs may carry a projection screen is described. The manner in which an image may be projected onto the screen may vary. For example, light, images or video may be projected from a ground or structure based projector. As another example, one or more UASs may carry the projection screen as well as a projector such that the projector may project light, images or video upon the projection screen is described. As such, this may all occur off the ground. In this embodiment, the projection screen and the projector may be carried by the same or different UAS(s).

In another aspect of the invention, a system wherein one or more UASs carry one or more displays that may be configured into a variety of shapes is described. In this aspect of the invention, the displays may be flexible or curved so that they may be configured into a variety of shapes.

In another aspect of the invention, a system wherein one or more UASs carry a camera and a projection screen, and one or more UASs carry a projector such that the camera may capture and transmit images or video to the projector and the projector may in turn project the images or video onto the projection screen is described. In an alternative embodiment of this aspect, one or more UASs may carry the projection screen, and one or more UASs may carry a camera and a projector such that the camera may capture and relay images or video to the projector and the projector may project the images or video onto the projection screen is described.

In another aspect of the invention, a system wherein one or more UASs carry a camera, a projector and a projection screen such that the camera may capture and relay images or video to the projector and the projector may project the images onto the projection screen is described.

In another aspect of the invention, a system wherein one or more UASs may carry a camera and a display such that the camera may capture and relay images or video to the display to be displayed is described.

In another aspect of the invention, a system wherein one or more UASs may carry a camera and a flexible, bent, curved or otherwise formable or manipulable display such that the camera may capture and relay images or video to the display to be displayed is described.

In another aspect of the invention, a system wherein one or more UASs may carry a display, and one or more UASs may carry a camera such that the camera may capture and transmit images or video to the display to be displayed is described.

In yet another aspect of the invention, a system wherein one or more UASs may carry a flexible or curved display, and one or more UASs may carry a camera such that the camera may capture and transmit images or video to the display to be displayed is described.

In another aspect of the invention, the use of the above-described UASs with screens, cameras and/or lighting with water and/or light display is described. To this end, UASs as described above may be added to existing water and/or light display to provide enhanced effects. As an alternative, the above-described UASs may be designed into a new water and/or light display at the outset.

DETAILED DESCRIPTION OF THE PREFERRED EMBODIMENTS

Figure 1:
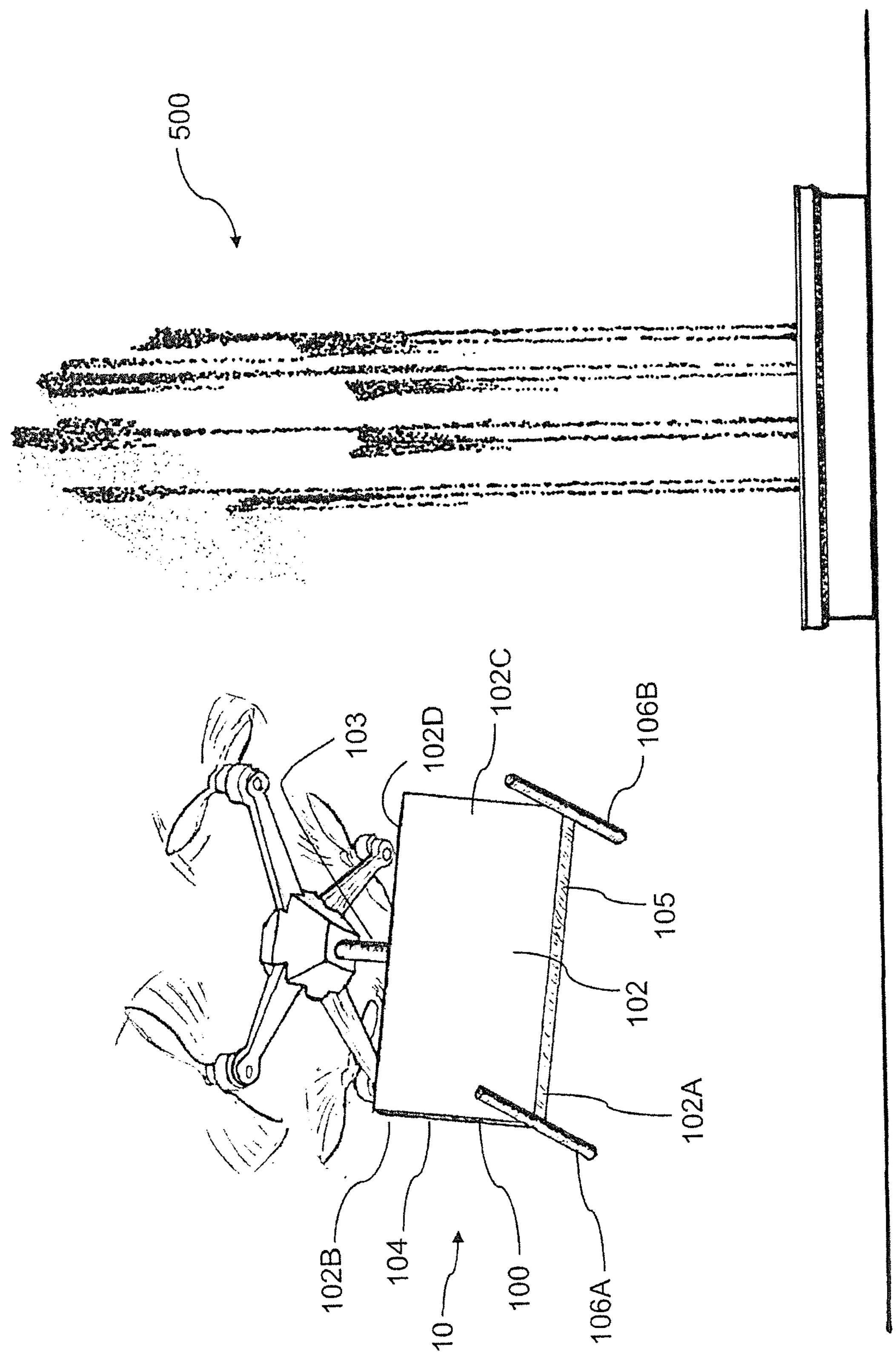
FIG. 1 shows a water display and a UAS configured with a screen in proximity to a water fountain or display.

The following detailed description is not intended to limit the current invention, in that alternate embodiments will be apparent to those skilled in the art and are within the scope of the invention. For example, the screen or display systems of the current invention may assume different configurations and may be used with different types of UASs. As another example, the screens or displays described herein may be used for various purposes. To this end, the screen or display may be used in connection with water and/or lighting displays to enhance, compliment, engage and/or work with the features of such displays.

Furthermore, the screen or display may be used as an advertisement. Still further, the screen or display may comprise various materials, such as graphene which is preferably flexible and may be used with UAS(s) to accommodate wind or other conditions associated with flying vehicles, and/or to provide unique displays that may be physically manipulated given its flexibility. Alternatively, the display or screen may be rigid or semi-rigid and light weight.

In the figures, the same or similar reference numerals may refer to the same or similar elements throughout the different views, as well as within the description below.

In one embodiment of the current invention as shown in FIG. 1, UAS 10 may be configured with screen 100. Screen 100 may be a projection screen such that light, images or video may be projected onto screen 100 to be viewed by audience members. In one example, UAS 10 configured with screen 100 may fly in relation to water display 500 such that the light, images or video that may be projected onto screen 100 may complement and be synchronized with the lighting and water elements of display 500 to enhance the expression of display 500 to the audience members. In other embodiments, screen 100 may be a display in and of itself or may serve as an advertising banner.

As shown in FIG. 1, screen 100 may be generally positioned below UAS 10 and supported by tether, rod, link or other type of support structure 103. In other embodiments, however, screen 100 may also be positioned generally above, to the side or in any other position relative to UAS 10. When configured with UAS 10, light, images or video may be projected onto screen 100 from a number of different projector sources. While screen 100 is depicted in FIG. 1 as being generally rectangular, screen 100 may be other shapes including circular, oval, square, triangular or other shapes. And while FIG. 1 shows a single support structure 103 attaching screen 100 to UAS 10, other numbers and types of support structures may be used, including rigid, semi-rigid and flexible materials.

As shown, screen 100 may generally have one or two sides upon which light, images and video may be projected, e.g., front side 102 and back side 104. However, screen 100 may have other numbers of sides upon which light, images or video may be projected. For example, as discussed later, UAS 10 may be configured with screen 100 that may be configured to form a triangular cross-section with three sides upon which light, images or video may be projected. UAS 10 may also be configured with screen 100 that may be configured to form a square or rectangular cross-section with four sides upon which light, images or video may be projected.

Screen 100 may be configured to form other shaped cross-sections with other numbers of sides upon which light, images or video may be projected for audience members to view. Alternatively, multiple-face screens 100 may also display an advertisement, instructions, safety advisory or similar display in more than one direction. In addition, UAS 10 may be configured with more than one screen 100 that may be formed into any of the shapes described above. It should also be noted that screen 100 may be large, and as such be best held aloft with more than one UAS 10.

Screen 100 may be configured to form shapes that are aerodynamic in nature, such as triangular, oval shaped, or other shapes, that may decrease drag on screen 100 caused by wind or the movement of UAS 10. Minimizing the drag on screen 100 may allow for easier movement and control of UAS 10, may allow UAS 10 to take off and fly at higher velocities, and may require less power consumption from UAS 10.

Screens 100 configured to form the 2-dimensional or 3-dimensional shapes described above may be pneumatic, or may include frames, fixtures or other type of support structures (not shown) that may support screens 100 or otherwise hold them together. These support structures may comprise metal, plastic or other materials and may include air channels that may allow air or wind to flow smoothly across or through the structures to decrease drag on screens 100. Other aerodynamic design elements or characteristics such as curves, grooves, rudders or other aerodynamic features may also be utilized.

In FIG. 1, screen 102 is shown as having a discrete thickness 105. However, the thickness 105 of screen 102 may vary to suit the conditions in which UAS 10 may be used. For example, thickness 105 may be increased where a more rigid screen 102 is desired, or decreased where screen flexibility is desired. Thickness 105 may also vary according to the extent to which it is desired that screen 102 remain flat in windy conditions and/or as UAS 10 travels.

Screen 102 may also include members, skids, or weights 106A, 1066 that may serve one or more functions. For example, members 106A, 106B may provide weight and stability to screen 102 so that screen 102 remains away from the propellers of UAS 10 in windy or other conditions, or when UAS 10 flies horizontally or non-vertically, or descends. It should be noted that members 106A, 106B may be configured differently, such as beads, or other configuration. As an alternative, a weight (not shown) may be attached to bottom edge 102A of screen 102 to provide the same function. In this embodiment, the weight may extend along a part of, or the entire length of bottom edge 102A. As another alternative, weights or stiffeners (not shown) may extend partly or entirely along the lengths of screen sides 1026, 102C, or along top side 102D to provide the same or similar function.

As another example, members 106A, 106B may function as landing skids so that when UAS 10 lands, screen 102 may be placed on the ground.

Figure 2:
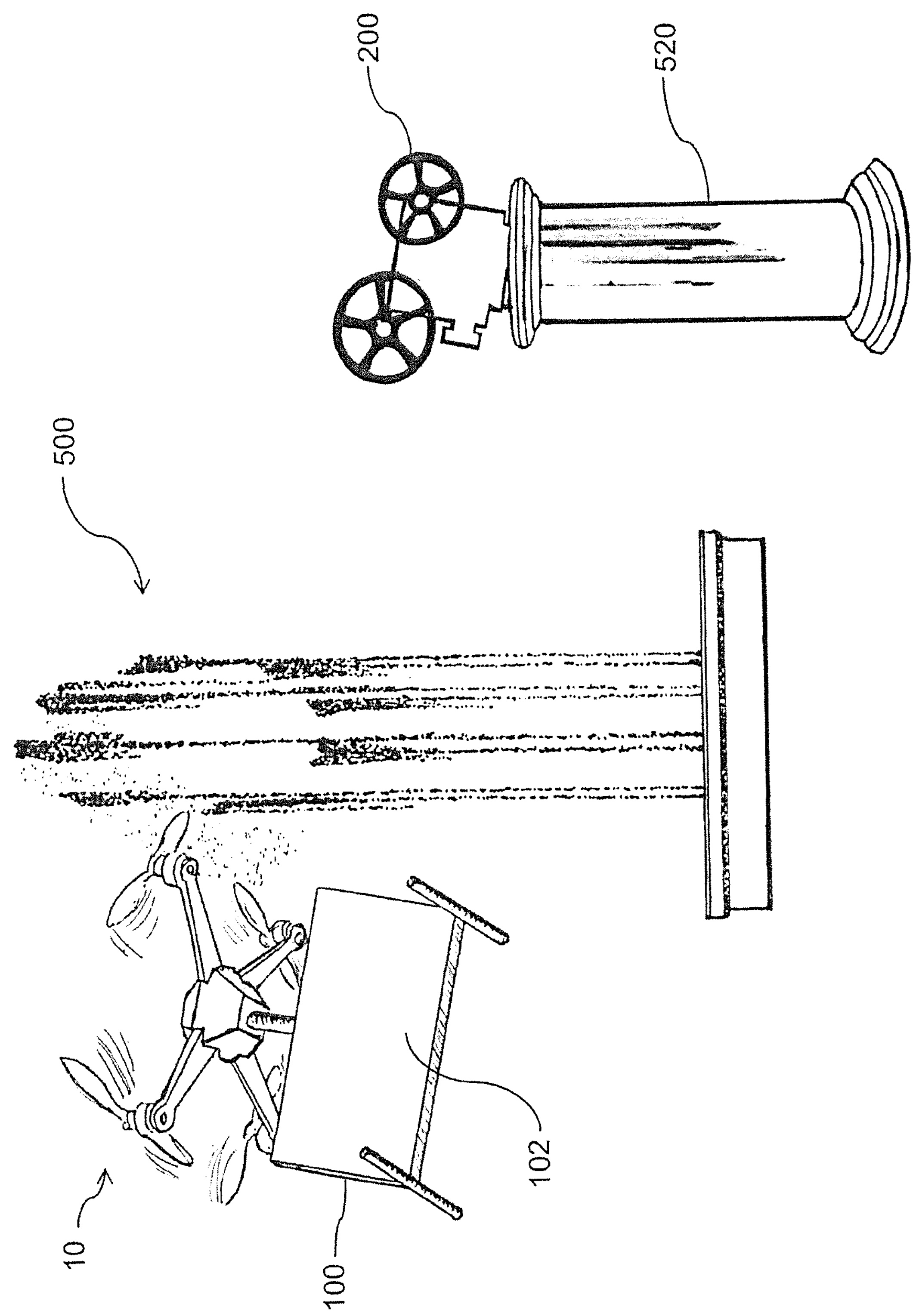
FIG. 2 shows a water display, a ground based projector and a UAS configured with a screen, and a projector located in proximity thereto.

In another embodiment as shown in FIG. 2, projector 200 may be configured with tower structure 520 extending on or above the ground such that projector 200 may be positioned to emit light, images or video onto screen 100 configured with UAS 10. Also, projector 200 may be configured without structure 520 and may be configured directly on the ground or to other types of structures or in other positions. In addition, projector 200 may be attached to a structure that may be moveable, such as a carriage on rails, such that projector 200 may have the ability to move its position. This may allow projector 200 to generally follow UAS 10 as it flies about water display 500 and to project light, images or video onto screen 100. Note that while FIG. 2 depicts a single projector 200 configured with a single tower structure 520, multiple projectors configured with or without structures 520 may also project light, images or videos onto screen 100. Screen 100 depicted in FIG. 2 may be configured in any of the general shapes as described with screen 100 in FIG. 1 and may or may not include frames or supports as described. Screen 100 and projector 200 (with or without tower 520) need not be used with water display 500 and may comprise a display, advertisement or other projection by itself.

Figure 3:
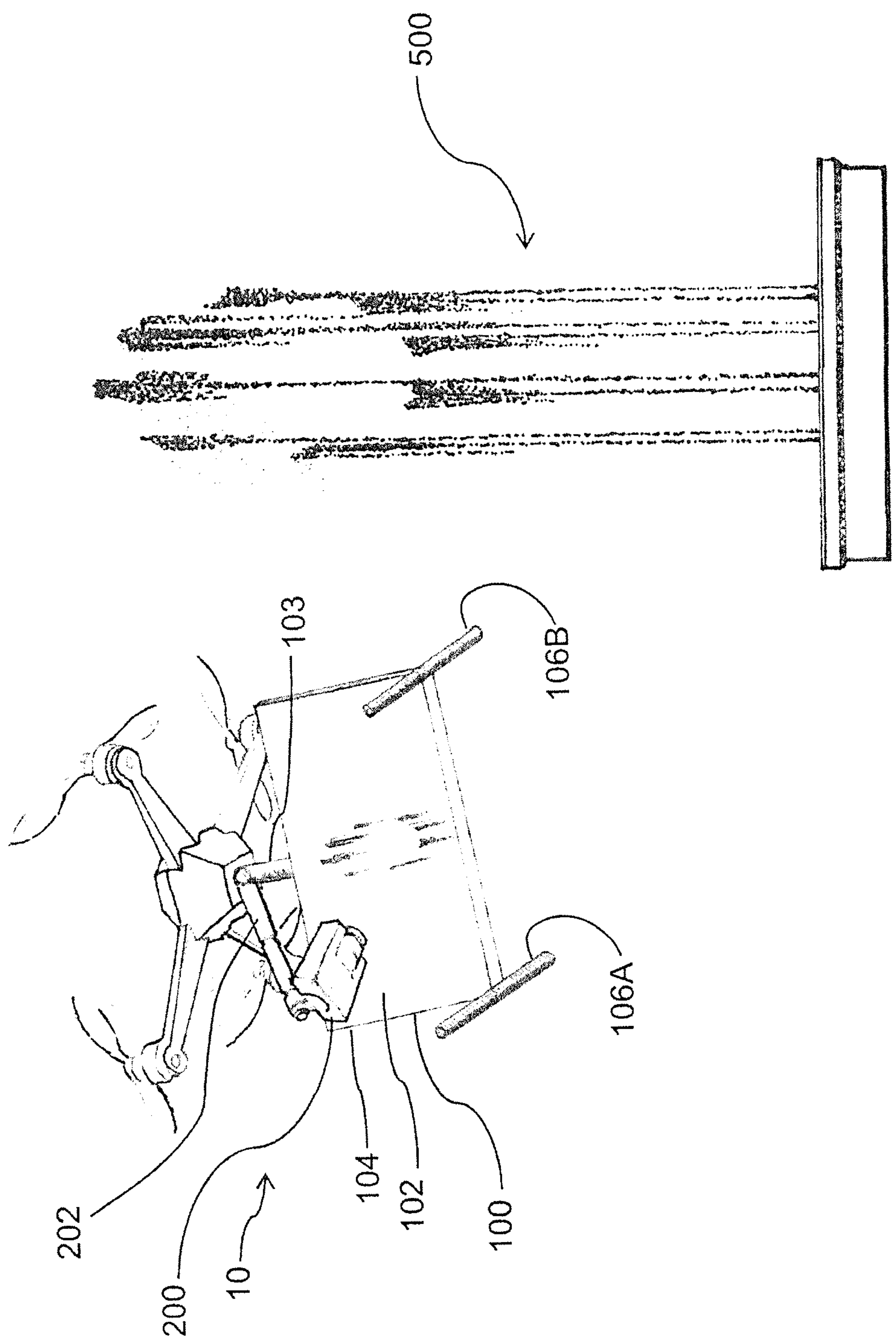
FIG. 3 shows a water display and a UAS configured with a screen.

In another embodiment, as depicted in FIG. 3, screen 100 may receive light, images or video projected onto it from projector 200 that may be configured with UAS 10. As shown, projector 200 may be positioned relative to UAS 10 so that it may project light, images or video onto front side 102 or back side 104 (not shown) of screen 100. To this end, projector 200 may be attached to arm or member 202 that may be attached to and extend from UAS 10 to position appropriately projector 200. Projector 200 may also be configured to UAS 10 using other means such as a cable or other attachment means, or may be integrated directly into UAS 10. As with the prior example, UAS 10 configured with screen 100 and projector 200 may fly in relation to water display 500 so that the light, images or video that may be projected onto screen 100 may complement and/or be synchronized with the lighting and water elements of display 500 while being viewed by the audience. Alternatively, UAS 10 may fly without display 500 and provide visual and/or entertainment effects by itself. Screen 100 depicted in FIG. 3 may also be configured in any of the general shapes as described with screen 100 in relation to FIG. 1 and may or may not include frames or supports as described.

It should be noted that more than one projector 200 may be configured with UAS 10 to project light, images or video onto screen 100. For instance, UAS 10 may be configured with two projectors 200 such that one projector 200 may project light, images or video onto front side 102 of screen 100, while the second projector 200 may project light, images or video onto back side 104 of screen 100. In another example, both projectors 200 may be positioned to project light, images or video onto front 102 of screen 100 or onto back 104 of screen 100. In addition, screen 100 may have any other number of sides that any other number of projectors 200 may project upon. Also, any number of projectors 200 may be configured with UAS 10 to project light, images or video onto any number of sides of any number of screens 100 that may be configured with UAS 10.

In one embodiment, a fleet of UASs 10 configured with screens 100 and projectors 200 may be programmed to fly in unison with the water elements of water display 500, e.g., encircling display 500, in a choreographed manner while displaying colorful light, images and video on displays 100 to enhance and complement display 500 and to add an element to overall visual effect to the water and light show.

Figure 4:
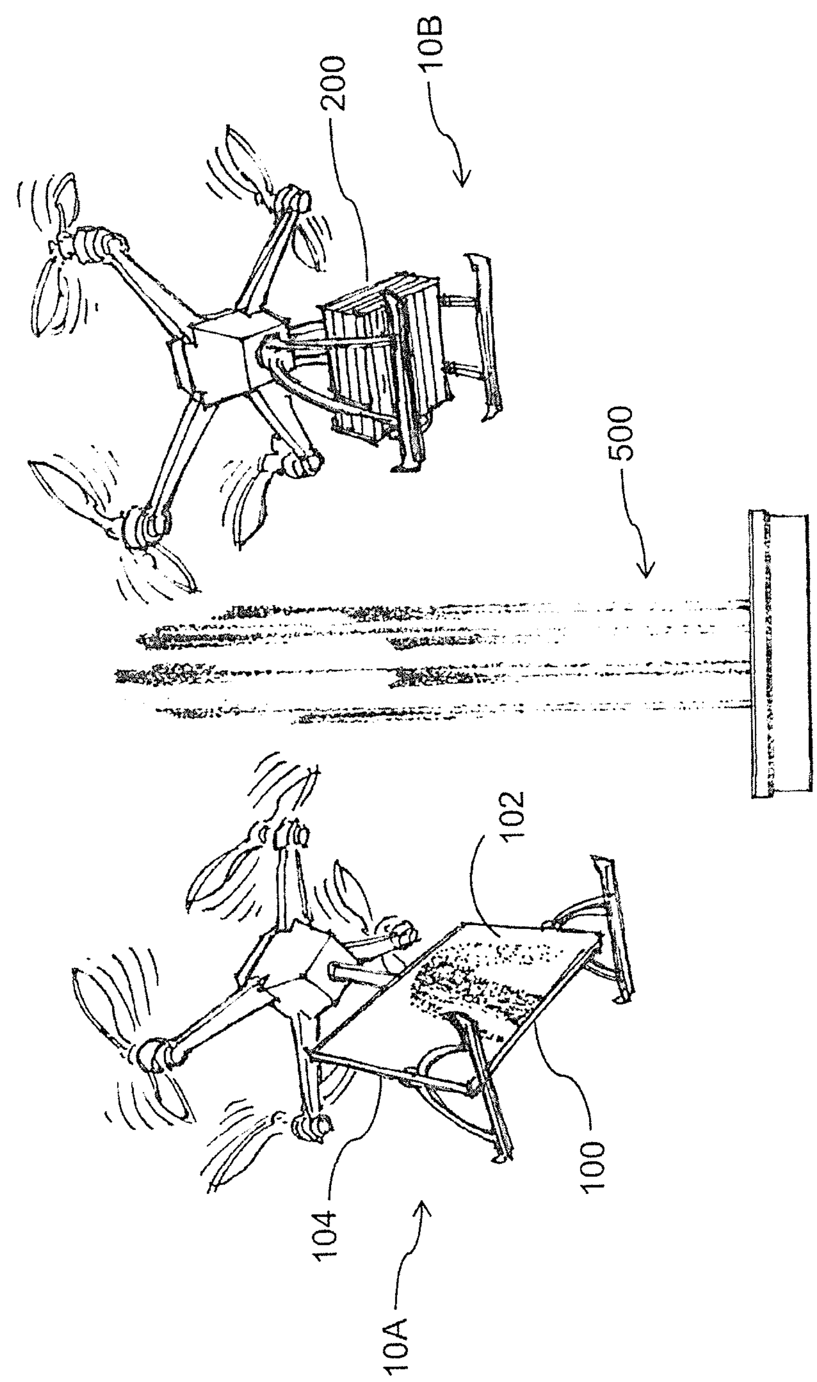
FIG. 4 shows a water display, a UAS configured with a screen, and a UAS configured with a projector.

In another embodiment as depicted in FIG. 4, UAS 10A may be configured with screen 100 and UAS 10B may be configured with projector 200 such that projector 200 may project light, images and video onto screen 100. In this embodiment it may be preferable for UAS 10A and UAS 10B to be flown in close proximity and in proper positioning such that light, images and video emitted from projector 200 may reach and be visibly projected onto screen 100. To this end, UASs 10A, 10B may fly in relation to each other and to water display 500 such that the light, images or video that may be projected onto screen 100 may complement and be synchronized with the lighting and water elements of display 500 while being viewed by the audience. For example, UASs 10A, 10B may be positioned so that the light from projector 10B is beamed through the water display 500 before striking screen 100.

It should be noted that while screen 100 is depicted to be positioned generally below UAS 10A and projector 200 is depicted to be generally positioned below UAS 10B, screen 100 and projector 200 may be configured in any position with respect to UAS 10A and UAS 10B respectively. Also, screen 100 depicted in FIG. 4 may be configured in any of the general shapes as described with screen 100 in relation to FIG. 1 and may or may not include frames or supports as described.

In addition, multiple UASs 10A configured with screens 100 and multiple UASs 10B configured with projectors 200 may be used. For example, in the case where screen 100 may comprise two surfaces that may be projected upon, e.g., a front 102 and a back 104, two UASs 10B configured with projectors 200 may each project light, images or video onto each side of screen 100, one projector 200 projecting onto front side 102 and one projector 200 projecting onto back side 104. Also, UAS 10B may be configured with more than one projector 200 and may project onto more than one UAS 10A configured with screen 100. In addition, UAS 10A may be configured with screen 100 that may have multiple sides, such as the shaped screens 100 described above, such that each side may be projected upon by projectors 200 configured with various UASs 10B. UASs 10A may also be configured with more than one screen 100 that may be projected onto by one or more UASs 10B configured with one or more projectors 200. As such, any number of projectors 200 configured with any number of UASs 10B may project light, images or video onto any number of screens 100 configured with any number of UASs 10A.

It may be preferable for UASs 10A, 10B to be controlled individually or in combination by a pilot in real time using a manual control system such as a control panel or joystick. Alternatively, UASs 10A, 10B may be controlled by a computer or other type of automated controller. This may ensure that UAS 10A and UAS 10B are maneuvered such that light, images or video emitted by projector 200 may be projected upon screen 100. Aspects of UASs 10A, 10B that may be controlled may include: 1) the physical position, orientation and flight coordinates of UAS 10A and UAS 10B with respect to each other and with water display 500, 2) the position and orientation of screen 100 with respect to projector 200, and 3) any other aspect that may need to be controlled to allow the projection of light, images or video by projector 200 onto screen 100.

Software may reside on the computer or controller that may include pre-programmed choreography sequences to allow for fully automated shows between UASs 10A, 10B in combination with the water and light elements of water display 500 to take place with minimal human intervention. Conversely, the software may allow for the manual orchestration of UAS 10A with screen 100 and UAS 10B with projector 200. In addition, the software may allow for a combination of automated pre-programmed shows that may be manually altered or otherwise manually controlled in real time as desired.

Figure 5:
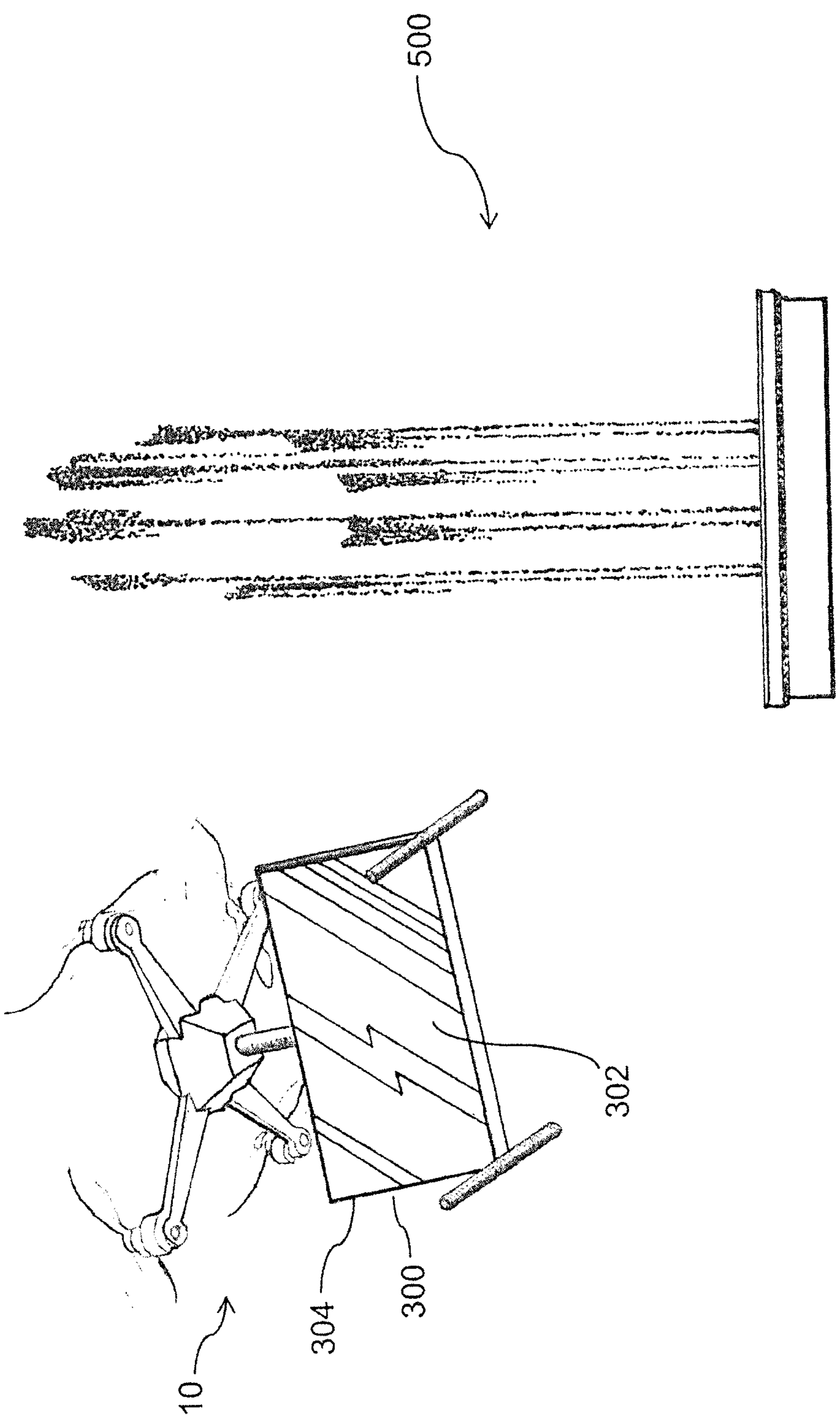
FIG. 5 shows a water display and a UAS configured with a display.

In another embodiment of the current invention as shown in FIG. 5, UAS 10 may be configured with display 300. Display 300 may be a plasma display, a liquid-crystal display (LCD), a light emitting diode display (LED), rear projection, or other type of display that may display light, images or video that may be viewed by audience members. In one example, UAS 10 configured with display 300 may fly in relation to water display 500 such that the light, images or video that may be displayed on display 300 may complement and be synchronized with the lighting and water elements of display 500 while being viewed by the audience. It can be seen that displaying images or video upon displays 300 may have benefits over projecting images or video onto screens 100 in that screens 100 may need to be properly aligned with projectors 200, which may be adversely affected by wind conditions or other factors, while displays 300 do not.

As shown in FIG. 5, display 300 may be generally positioned below UAS 10 but may also be positioned generally above, to the side or in any other position with respect to UAS 10. While screen 300 is depicted in FIG. 5 as being generally rectangular, display 300 may be other shapes including circular, oval, square, triangular or other shapes. Also, while display 300 is depicted as having generally one or two sides that may display light, images or video, that is, front side 302 and back side 304, display 300 may have other numbers of sides that may display light, images and video, or UAS 10 may be configured with more than one display 300.

Figure 6A:
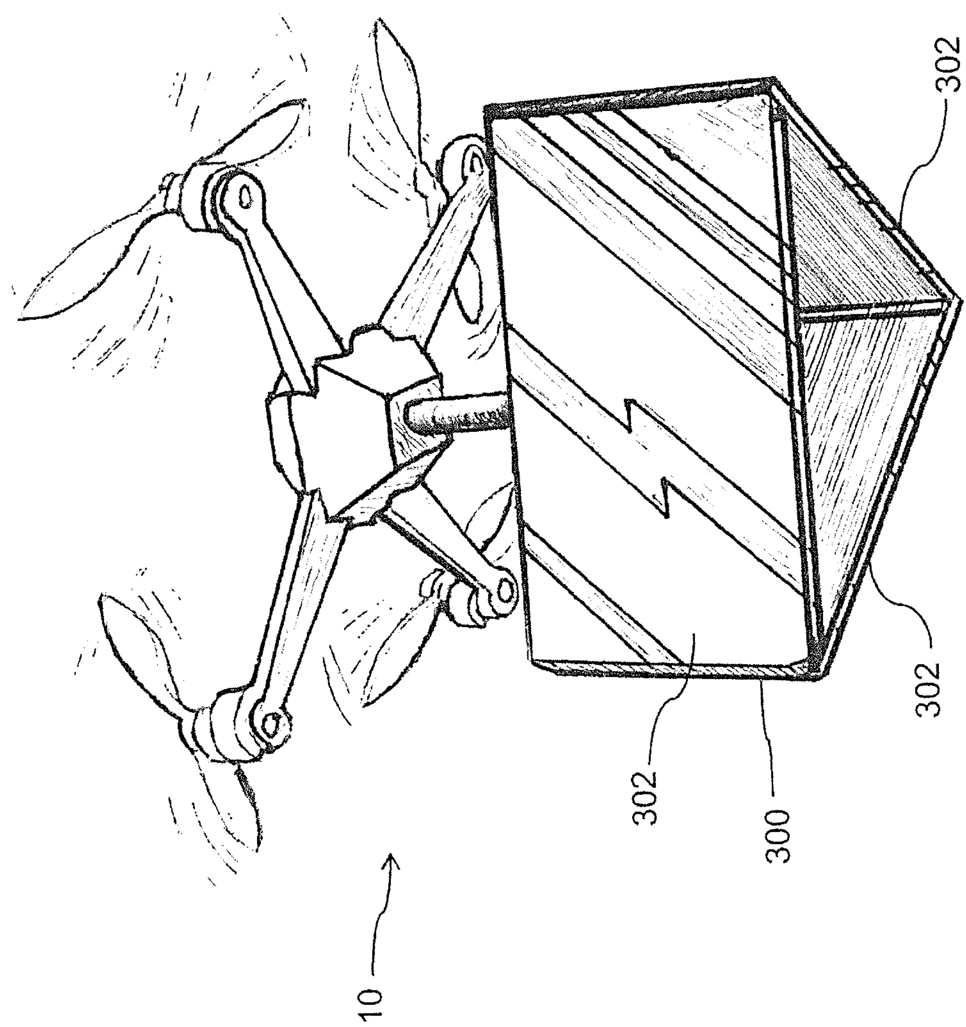
FIG. 6A shows a UAS configured with a triangular display.
Figure 6B:
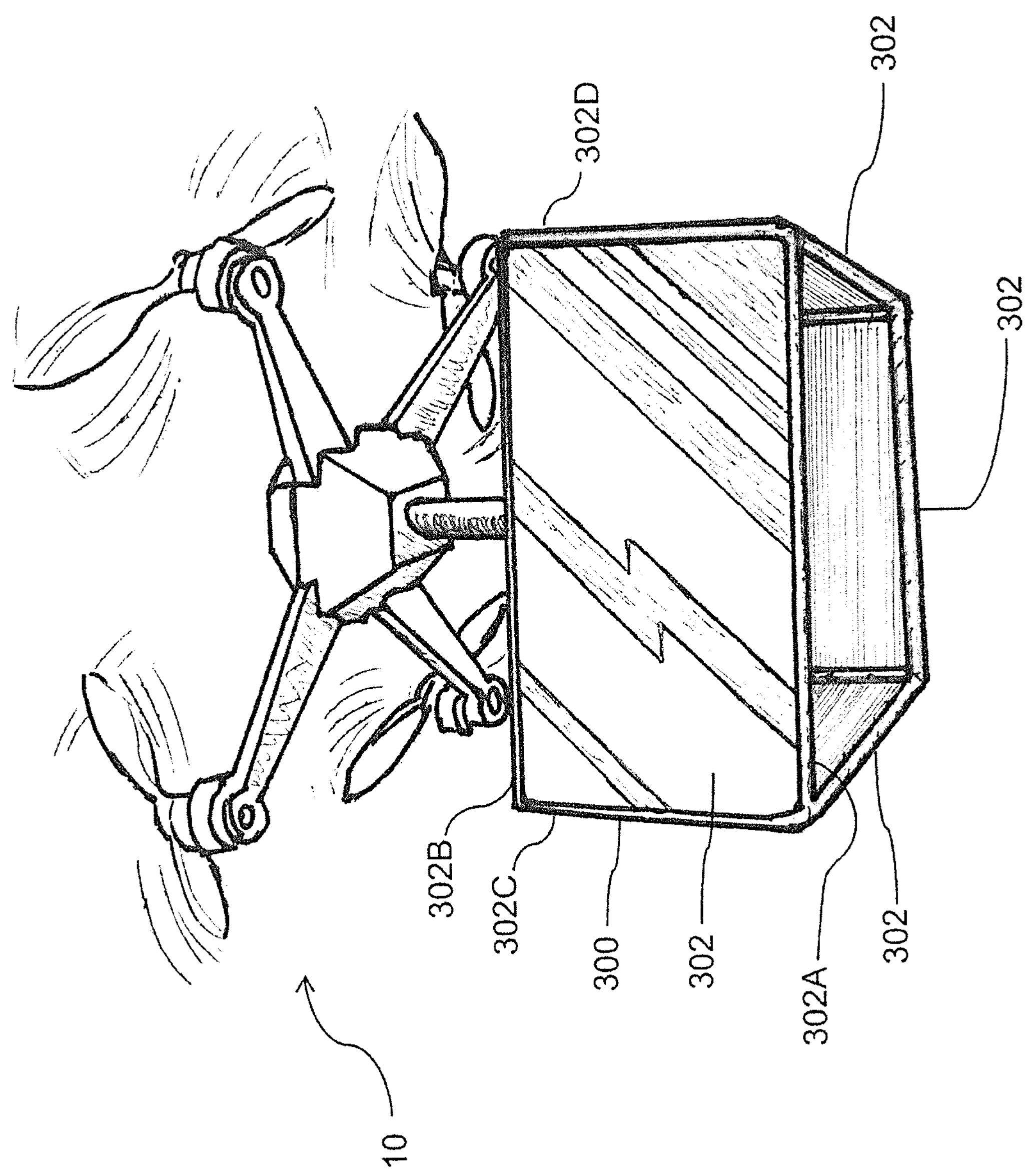
FIG. 6B shows a UAS configured with a square or rectangular display.

For example, in FIG. 6A, UAS 10 may be configured with three displays 300 that may be configured to form a triangular cross-section as depicted in FIG. 6A, or four displays 300 that may be configured to form a square or rectangular cross-section as depicted in FIG. 6B. In each of these examples, each display 300 may have a side 302 that may display light, images or video for audience members to view. Other numbers of displays 300, such as five, six and other numbers, may be configured to create other shaped cross-sections with other numbers of sides that may display light, images or video for audience members to view. In addition, a single display 300 may be configured to form the above described shapes and configurations without the use of multiple displays. It should be noted that display 300 may be large enough such that more than one UAS 10 may be required to hold it aloft.

In the embodiment of FIG. 5, display 300 comprising a plasma, LCD, LED or other screen preferably does not require a separate projector. Instead, the display 300 may be self-contained and provide images itself.

In addition, displays 300 may be configured to form shapes that are aerodynamic in nature (such as triangular or oval shaped) that may decrease drag on displays 300 caused by wind or the movement of UAS 10. Minimizing the drag on displays 300 may allow for easier movement and control of UAS 10, may allow UAS 10 to take off and fly at higher velocities, and may require less power consumption from UAS 10.

Displays 300 may also include frames, fixtures or other type of support structures (not shown) or pneumatic pressure for stiffness that may support displays 300 or otherwise hold them together. For example, the edges 302A, 302B, 302C, 302D of screen 300 may include stiffening members. These support structures may comprise metal, plastic or other materials and may include air channels that may allow air or wind to smoothly flow across or through the structures to decrease drag on displays 300. Other aerodynamic design elements or characteristics such as curves, grooves, rudders or other aerodynamic features may also be utilized.

Figure 7:
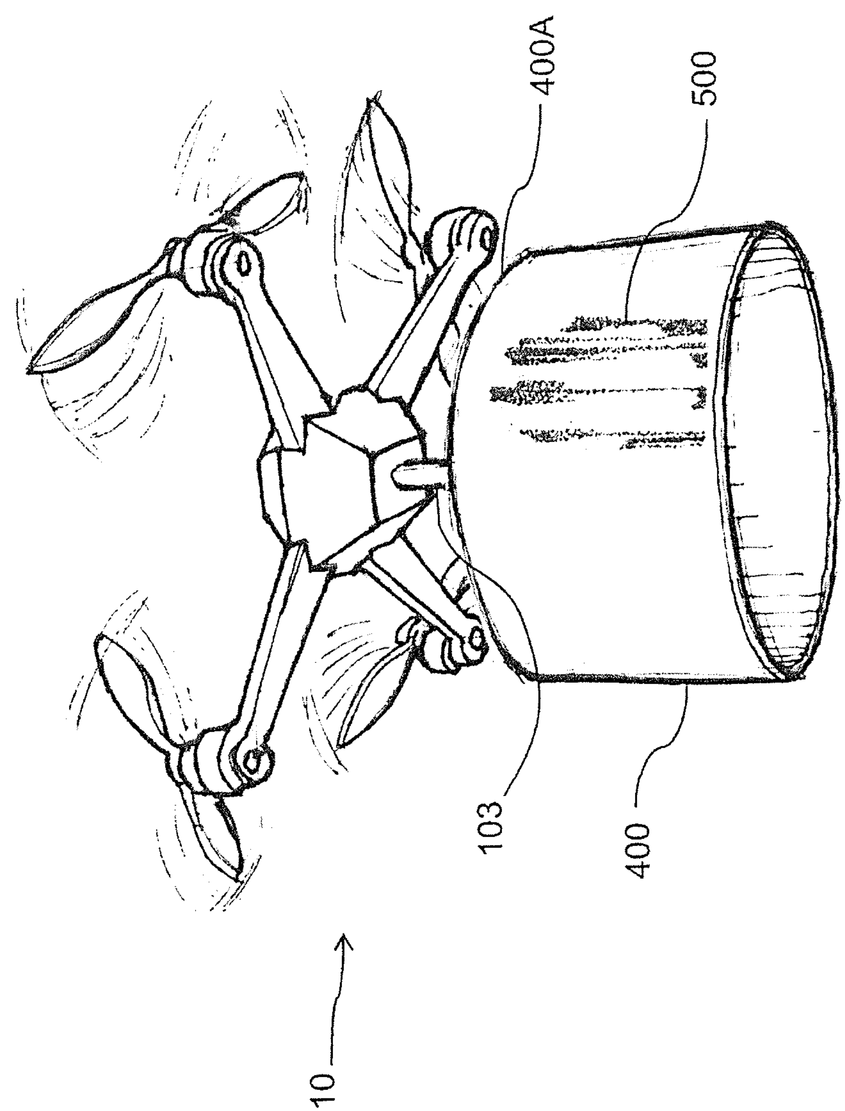
FIG. 7 shows a UAS configured with a bent, curved or flexible display in the shape of a cylinder.

In another embodiment, UAS 10 may be configured with flexible or curved display 400 as shown in FIG. 7. In one example, flexible display 400 may comprise a graphene display 400 that may be flexible and have the ability to be formed into shapes such as 2-dimensional squares, rectangles, triangles, circles, ovals, trapezoids and other shapes, and 3-dimensional shapes with cross sections that generally form circles (shown in FIG. 7), ovals, triangles, squares, rectangles, trapezoids and other shapes. In addition, it should be noted that other types of flexible displays 400 other than graphene displays 400 may be utilized. As shown in FIG. 7, flexible display 400 may be generally positioned below UAS 10 but may also be positioned generally above, to the side or in any other position with respect to UAS 10. In addition, more than one flexible display 400 may be configured with UAS 10.

One benefit of using flexible display 400 may be that flexible display 400 may be configured to form aerodynamic shapes such as thin 2-dimensional shapes or 3-dimensional shapes with oval, circular, triangular or other shaped cross sections that may minimize drag on display 400 caused by wind or the movement of UAS 10. Minimizing the drag on display 400 may allow for easier movement and control of UAS 10, may allow UAS 10 to take off and fly at higher velocities, and may require less power consumption from UAS 10.

Another benefit provided by flexible displays is that display 400 may deform due to wind or other inflight conditions. This may avoid the situation where a rigid display is flapping in the wind and may create instability to UAS 10. Further, graphene may display an electronic image on its screen that may still be transmitted despite screen 400 deforming in the wind or from other causes.

Flexible displays 400 configured to form the 2-dimensional or 3-dimensional shapes described above may also include frames, fixtures or other type of support structures (not shown) that may support displays 400 or otherwise hold them together. These support structures may be pneumatic, comprise metal, plastic or other materials, and may include air channels that may allow air or wind to smoothly flow across or through the structures to decrease drag on displays 400. Other aerodynamic design elements or characteristics such as curves, grooves, rudders or other aerodynamic features may also be utilized.

Display 400 may be connected to UAV by support member 103. As with the other embodiments described above, member 103 may be rigid, semi-rigid or flexible. Furthermore, support member 103 may include multiple members that may fan out to engage different parts of the top edge 400A or other locations of display 400.

Another benefit of utilizing flexible display 400 in the current invention may be that flexible displays may also be very light weight. Displays 400 that are light weight may be larger than other types of displays and still be light enough to be held aloft by one or more UASs 10. This may allow for very large flexible displays to be carried aloft in relation to water display 500 resulting in a very dramatic and entertaining show. It should be noted that payloads consisting of light weight displays 400 may also allow UAS 10 to be controlled and maneuvered much easier, to take off and fly at higher velocities due to the lesser weight payload, and to consume less power.

In addition, flexible displays 400, such as those utilizing graphene, may also be used as projection screens in and of themselves so that an electronic image may be sent to graphene display 400 and projected therefrom without the need for a separate projector that projects an image onto screen 400 from a distance. For example, an image of water display 500 may be transmitted by graphene screen 400. This arrangement may be suitable where certain audience members do not have a clear line of sight to water display 500 itself. But with display 500 being projected at elevation it may be seen by all.

Alternatively, light, images or video may be projected onto such flexible display 400. In any event, it is preferred that the display is visible to audience members in connection with a performance. Alternatively, it is preferred that display 400 may be visible to advertising or information recipients.

Any of the embodiments described above regarding screens 100 and projectors 200 may include graphene displays 400 that may both 1) display light, images or video and 2) have light, images or video projected upon them. Note that display 400 may simultaneously display light, images or video while having light, images or video projected upon it, or may display light, images or video independently of having light, images or video projected upon it.

Another benefit of utilizing flexible and light weight display 400 in the current invention is that it may allow for display 400 to be delivered into relatively small or tight spaces. It is a well-known practice for large air ships, blimps or other types of larger aircraft to tow banners or carry large displays that can be viewed by an audience from the ground. However, due to the large size of these types of aircraft, it is not practical or even possible to fly them into relatively small or tight airspaces such as may exist around water displays 500. That is, while the larger display 400 may fit into the small airspaces around water display 500, the larger aircraft carrying display 400 will not.

Conversely, due to the smaller size of UAS 10, it may be possible to fly UAS 10 configured with a relatively large and lightweight display 400 into small and tight airspaces around water display 500. This may allow light, images or video that may be displayed by display 400 to enhance the dramatic effect of water display 500 while being viewed by audience members on the ground.

Furthermore, the smaller size of UAS 10 in comparison to larger aircraft allows it to be more maneuverable in relation to a water display 500. As such, any light, video, image or other display provided by screen 400 may dart in and around display 500 or provide more dramatic choreographed movements that larger, less maneuverable aircraft could.

In addition, even if larger aircraft such as blimps or smaller floating inflatables configured with large displays were to be flown in close proximity of display 500, while the larger display may be viewable by audience members on the ground, water display 500 itself may be seriously obstructed by the larger aircraft. However, due to the smaller size of UAS 10, water display 500 will not be obstructed by UAS 10 configured with large display 400 when UAS 10 is flown in close proximity to the display 500. In this manner, UASs 10 may be used in concert with display 500 to provide overall dramatic visual effects.

In the embodiments of the current invention, UAS 10, 10A, 10B may include camera 600. Camera 600 may have the ability to take still image pictures, video footage, a combination of still images and video, or other types of footage of water display 500, audience members, presenters, or other subjects from elevated perspectives and vantage points previously unattainable.

Figure 8:
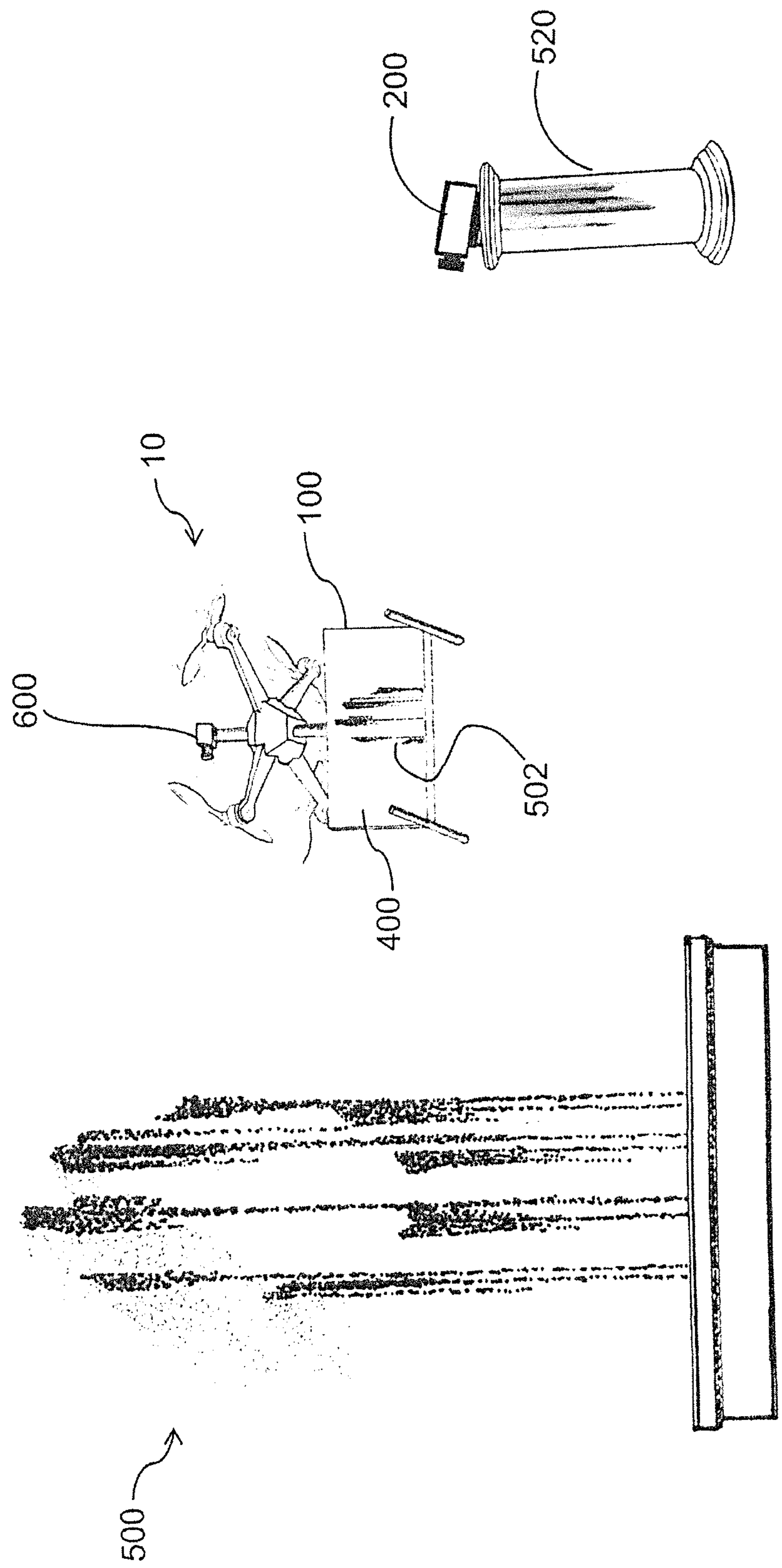
FIG. 8 shows a water display, a ground based projector and a UAS configured with a camera and a display.

In one embodiment of this type, UAS 10 configured with screen 100 may be configured with camera 600 as depicted in FIG. 8. In a preferred embodiment, such as where screen 100 comprises graphene, camera 600 may take pictures and/or video and directly transmit them to graphene screen 100. For example, as shown in FIG. 8, camera 600 may take a picture or video of water display 500 and transmit this image 502 to graphene screen 100.

Alternatively, UAS 10 may also be configured with a transmitter (not shown) such that images or video captured by camera 600 may be transmitted to a receiver (not shown) that may be configured with projector 200. Projector 200 may be configured with structure 520 as shown or may be located on or near the ground or in another location with or without structure 520. Projector 200 may receive transmitted images or video from camera 600 via the receiver and may project them onto screen 100 configured with UAS 10.

Either the direct transmission to graphene display 400 or to projector 200 may allow for images or video footage taken by camera 600 to be projected onto screen 100 in real time. It should be noted that projector 200 may also project the images or video footage onto different screens 100 that may be configured with different UASs 10 that may be configured with or without different cameras 600. In addition, UAS 10 may be configured with multiple cameras 600 that may take and transmit images or video to projector 200. It should also be noted that projector 200 may receive images or video from multiple cameras 600 configured with one or more UASs 10, simultaneously or independently, and may project them onto one or more screens 100 configured with one or more UASs 10.

While camera 600 is depicted in FIG. 8 as being positioned generally above UAS 10 and above screen 100, camera 600 may be configured in other positions with respect to UAS 10 and screen 100, such as below, or to the sides where multiple cameras 600 may be used to offset each other's weight. Also, while screen 100 is shown to be generally positioned below UAS 10 and camera 600, screen 100 may be configured in any position with respect to UAS 10 and camera 600. In addition, screen 100 depicted in FIG. 8 may be configured in any of the general shapes as described with screen 100 in relation to FIG. 1 and may or may not include frames or supports as described.

Figure 9:
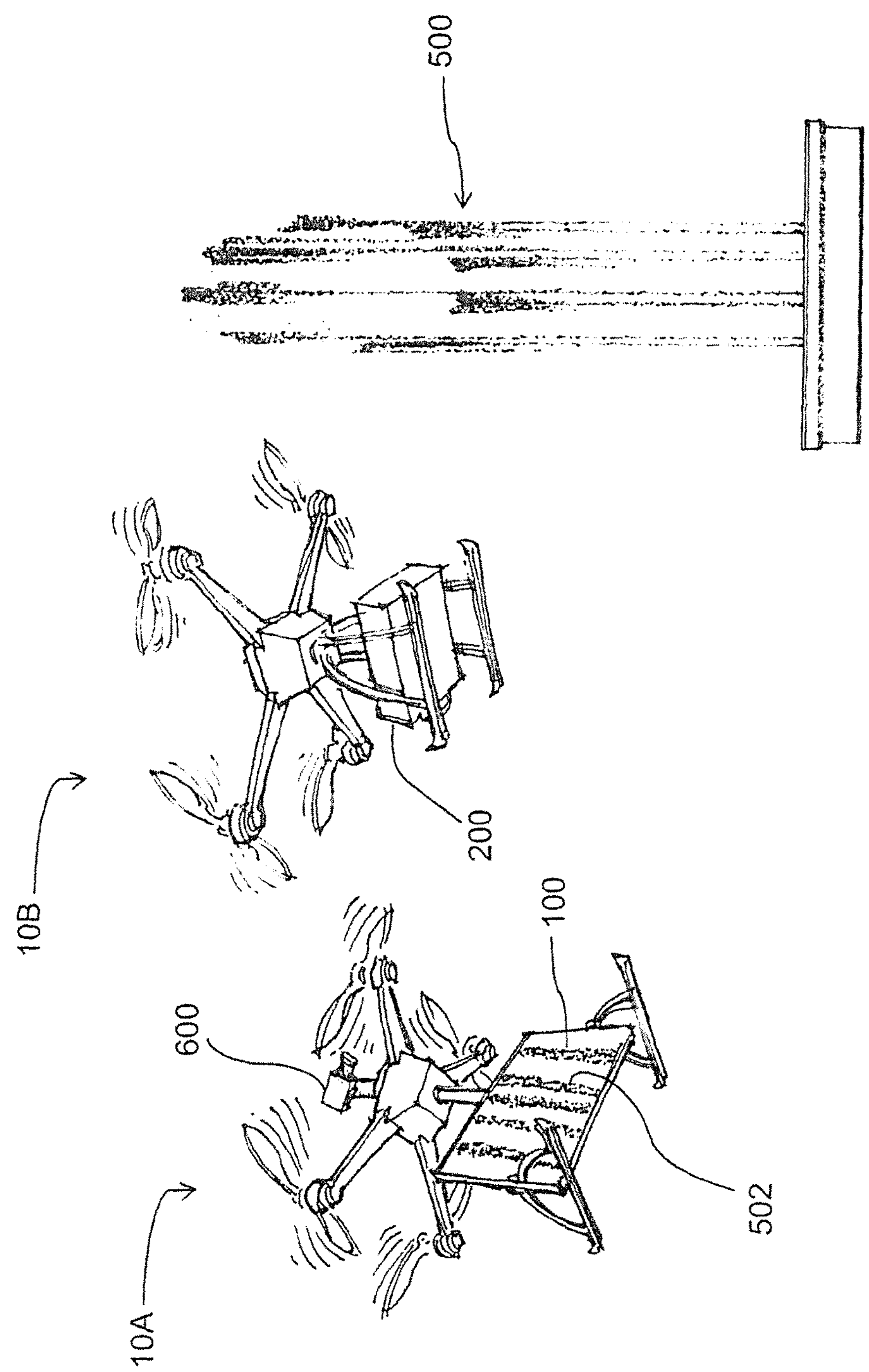
FIG. 9 shows a water display, a UAS configured with a camera and a display, and a UAS configured with a projector.

In another embodiment as shown in FIG. 9, UAS 10A configured with screen 100 may also be configured with camera 600. UAS 10A may also be configured with a transmitter (not shown) such that images or video captured by camera 600 may be transmitted to a receiver (not shown) that may be configured with projector 200. Projector 200 may be configured with UAS 10B. Projector 200 may receive transmitted images or video from camera 600 via the receiver and may project them onto screen 100 configured with UAS 10A. This may allow for images or video footage taken by camera 600 to be projected onto screen 100 in real time. For example, an image 502 of water display 500 may be captured by camera 600, transmitted to projector 200 and projected onto screen 100.

Projector 200 may also project the images or video footage onto different screens 100 that may be configured with different UASs 10A that may be configured with or without different cameras 600. In addition, UAS 10A may be configured with multiple cameras 600 that may take and transmit images or video to projector 200. Projector 200 may also receive images or video from multiple cameras 600 configured with one or more UASs 10A, simultaneously or independently, and may project them onto one or more screens 100 configured with one or more UASs 10A.

While camera 600 is depicted in FIG. 9 as being positioned generally above UAS 10A and above screen 100, camera 600 may be configured in other positions with respect to UAS 10A and screen 100. Also, screen 100 may be configured in other positions with respect to UAS 10A and camera 600 and projector 200 may be configured in other positions with respect to UAS 10B. In addition, screen 100 depicted in FIG. 9 may be configured in any of the general shapes as described with screen 100 in relation to FIG. 1 and may or may not include frames or supports as described.

Figure 10:
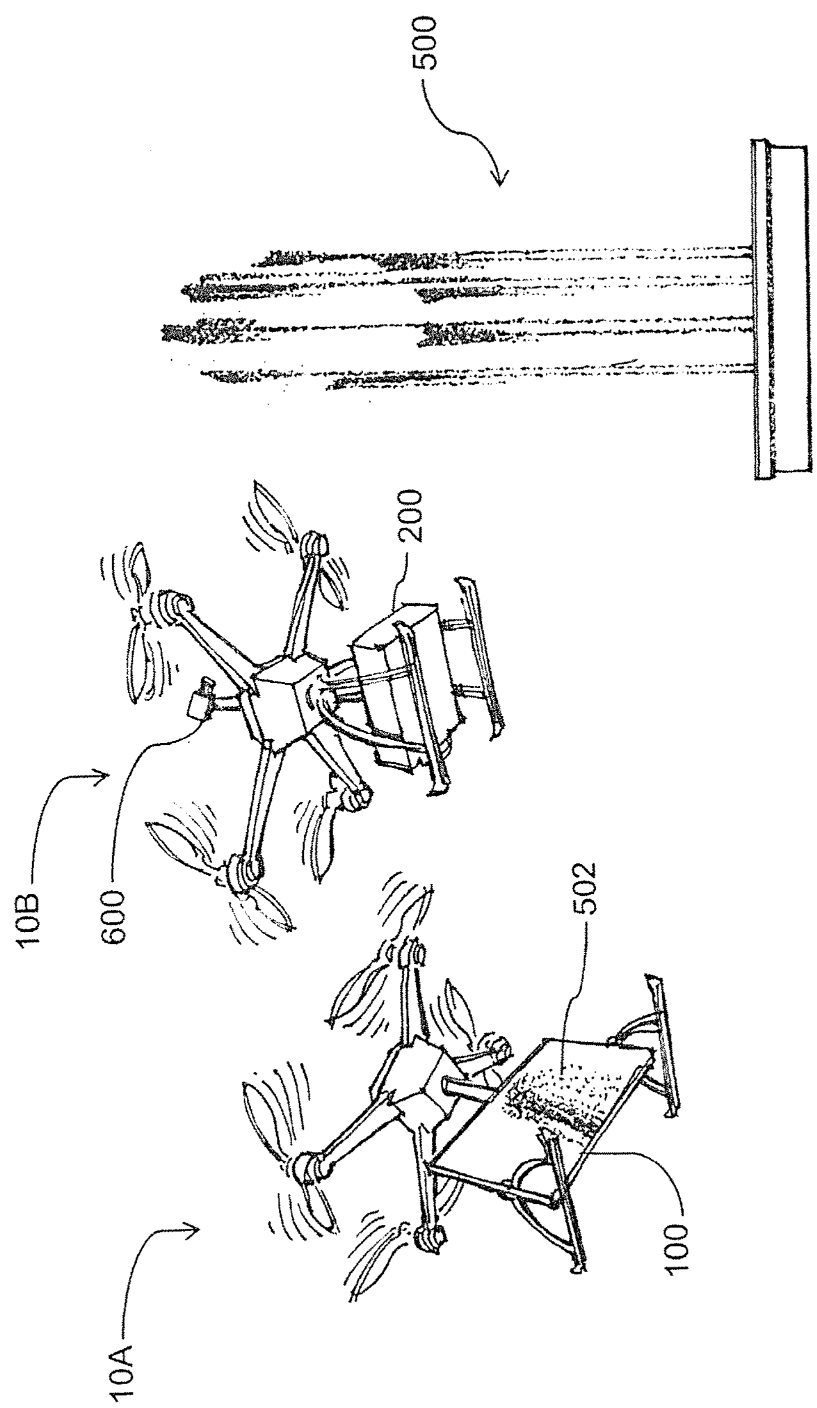
FIG. 10 shows a water display, a UAS configured with a screen, and a UAS configured with a camera and a projector.

In another embodiment as shown in FIG. 10, UAS 10B configured with projector 200 may be configured with camera 600. Images or video captured by camera 600 may be relayed to projector 200 such that projector 200 may project them onto screen 100 configured with UAS 10A. This may allow for images or video footage taken by camera 600 to be projected onto screen 100 in real time. As shown, image 502 of display 500 may be captured, transmitted and projected onto screen 100.

UAS 10B may be configured with one or more cameras 600 that may take and relay images or video to projector 200 to be projected onto one or more screens 100 configured with one or more UASs 10A. Also, camera 600 may be configured in any position with respect to UAS 10B and projector 200, and projector 200 may be configured in any position with respect to UAS 10B and camera 600. In addition, screen 100 may be configured in any position with respect to UAS 10A, may be configured in any of the general shapes as described with screen 100 in relation to FIG. 1 and may or may not include frames or supports as described.

Figure 11:
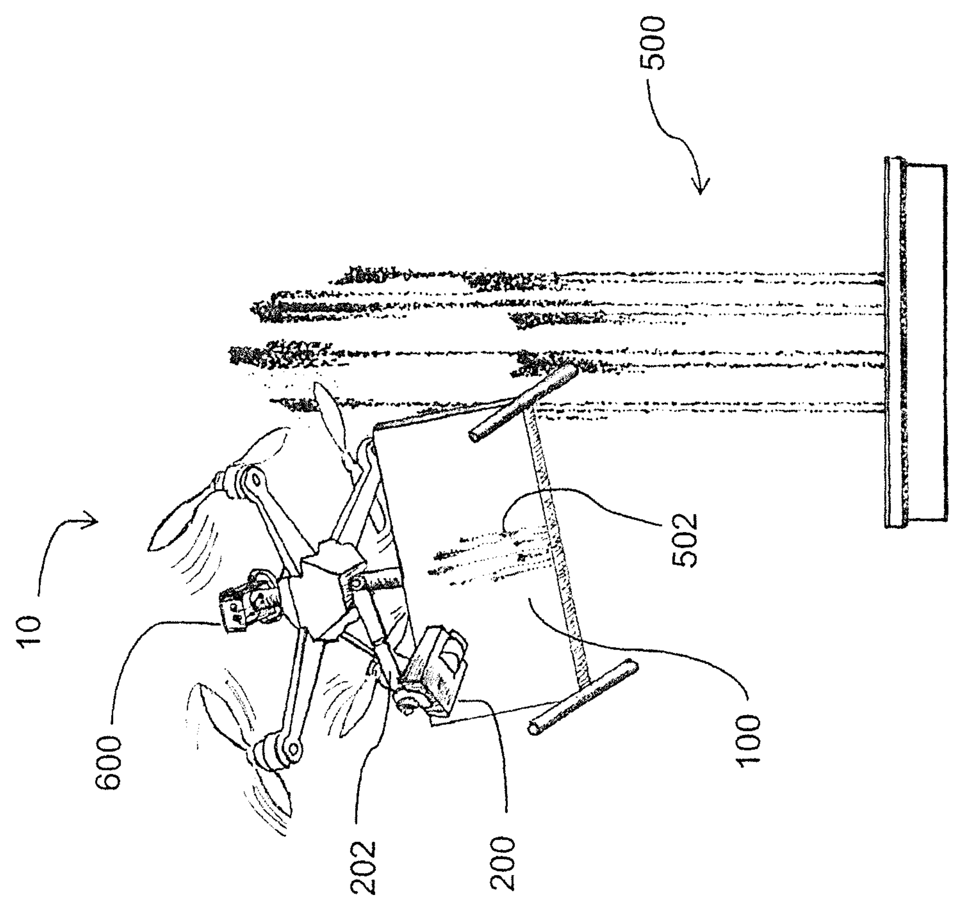
FIG. 11 shows a water display and a UAS configured with a camera, a projector and a screen.

In another embodiment as depicted in FIG. 11, UAS 10 may be configured with screen 100, projector 200 and camera 600. Images or video taken by camera 600 may be transmitted or relayed to projector 200 and be projected upon screen 100. Projector 200 may be attached to arm 202 that may be attached to and extend from UAS 10 to position projector 200 such that it may project images or video onto screen 100. Arm 202 may articulate and/or may be jointed to allow it to assume different positions relative to screen 100. It should be noted, however, that projector 200 may also be configured to UAS using other means such as a cable or other attachment means, or may be integrated directly into UAS 10. UAS 10 configured with screen 100 and projector 200 may fly in relation to water display 500 such that images or video 502 taken by camera 600 and projected onto screen 100 may complement and be synchronized with the lighting and water elements of display 500 while being viewed by audience members of the display 500.

It should be noted that screen 100 depicted in FIG. 11 may be configured in any of the general shapes as described with screen 100 in relation to FIG. 1 and may or may not include frames or supports as described. Also, any number of cameras 600 and projectors 200 may be configured with UAS 10 to take and project images or video onto any number of sides of any number of screens 100 that may be configured with UAS 10.

Figure 12:
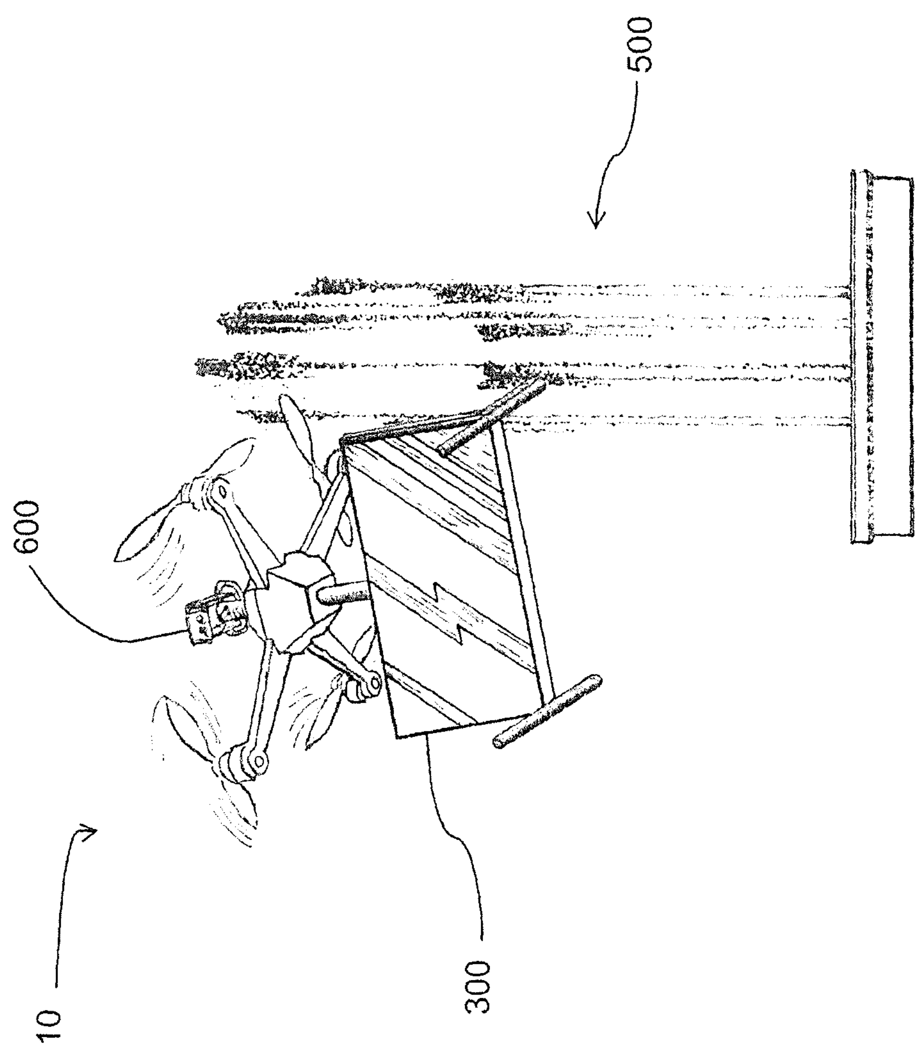
FIG. 12 shows a water display and a UAS configured with a camera and a display.

In another embodiment of the current invention as shown in FIG. 12, UAS 10 may be configured with display 300 and camera 600. Images or video captured by camera 600 may be relayed to display 300 to be displayed for audience members to view. Display 300 may be a graphene display, plasma display, a liquid-crystal display (LCD), a light emitting diode display (LED) or other type of display. In one example, UAS 10 configured with display 300 and camera 600 may capture images or video of water display 500 from high up vantage points and then display them in real time on display 300 for the audience to view from below. Seeing images from these new and previously unachievable vantage points preferably adds a new and very exciting entertainment element to water display 500.

As shown in FIG. 12, display 300 may be generally positioned below UAS 10 and camera 600 or may be configured in any other position with respect to UAS 10 and camera 600. Also, camera 600 may be positioned above UAS 10 as shown, but may be configured in other positions with respect to UAS 10 and display 300, or may be generally integrated into UAS 10 or display 300. In addition, display 300 depicted in FIG. 12 may include one or more displays 300 that may be configured and utilized in any of the general configurations as described in relation to FIGS. 5, 6A and 6B and similar embodiments, and may or may not include frames or supports as described.

In addition, UAS 10 may be configured with more than one camera 600. In this scenario, each camera 600 may capture images and video and relay them to display 300, or to more than one display 300 if multiple displays 300 exist. In one example, UAS 10 may be configured with three displays 300 that may form a triangular cross-section and three cameras 600 such that each camera 600 may capture images or video and relay them to one, several or all displays 300. The triangular cross-sectional display 300 may rotate with respect to UAS 10 such that different images or video displayed on different displays 300 may rotate in and out of view to the audience below. It can be seen that UAS 10 may be configured with any number of displays 300 and any number of cameras 600 and that any number of cameras 600 may relay images or video to any number of displays 300 to display for audience members to view.

Figure 13:
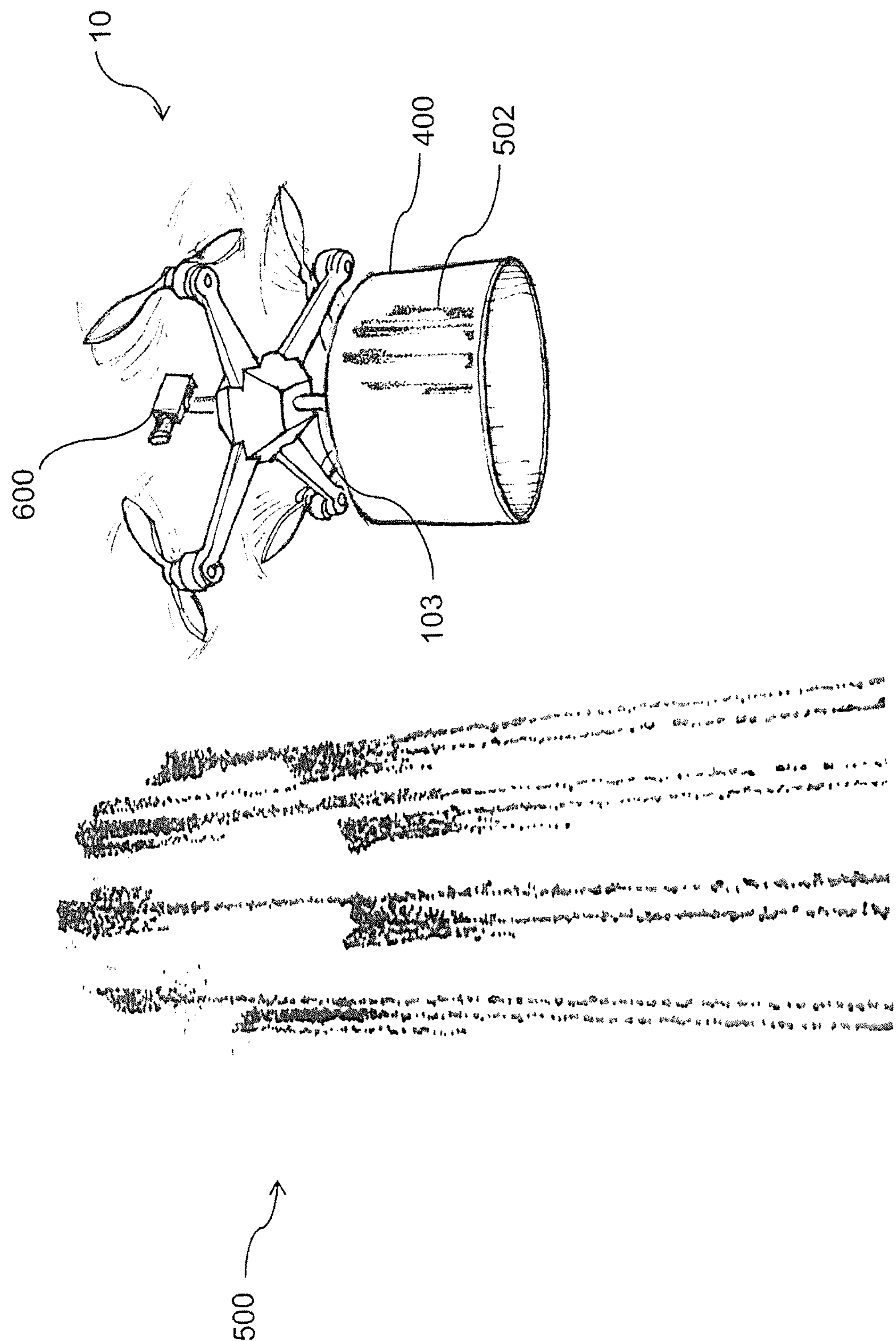
FIG. 13 shows a water display and a UAS configured with a camera and a flexible display.

In another embodiment, UAS 10 may be configured with flexible display 400 and camera 600 as shown in FIG. 13. Images or video captured by camera 600 may be transmitted or relayed to display 400 to be displayed to audience members or other information recipients. Flexible display 400 may comprise a graphene display 400 or other types of flexible display 400. As noted earlier, support 103 may comprise one or more members comprising different types of materials. In addition, display 400 depicted in FIG. 13 may include one or more displays 400 that may be configured and utilized in any of the general configurations as described in relation to FIG. 7 and similar embodiments, and may or may not include frames or supports as described. Also, UAS 10 may be configured with any number of displays 400 with any number of sides, and any number of cameras 600, and that any number of cameras 600 may relay images or video to any number of sides of any number of displays 400 to display for audience members to view.

In one example, UAS 10 configured with display 400 and camera 600 may capture images or video of water display 500 from high up vantage points and then display them in real time on display 400 for the audience to view from below. One can imagine that seeing images from these new and previously unachievable vantage points may add a new and very exciting entertainment element to water display 500.

Figure 14:
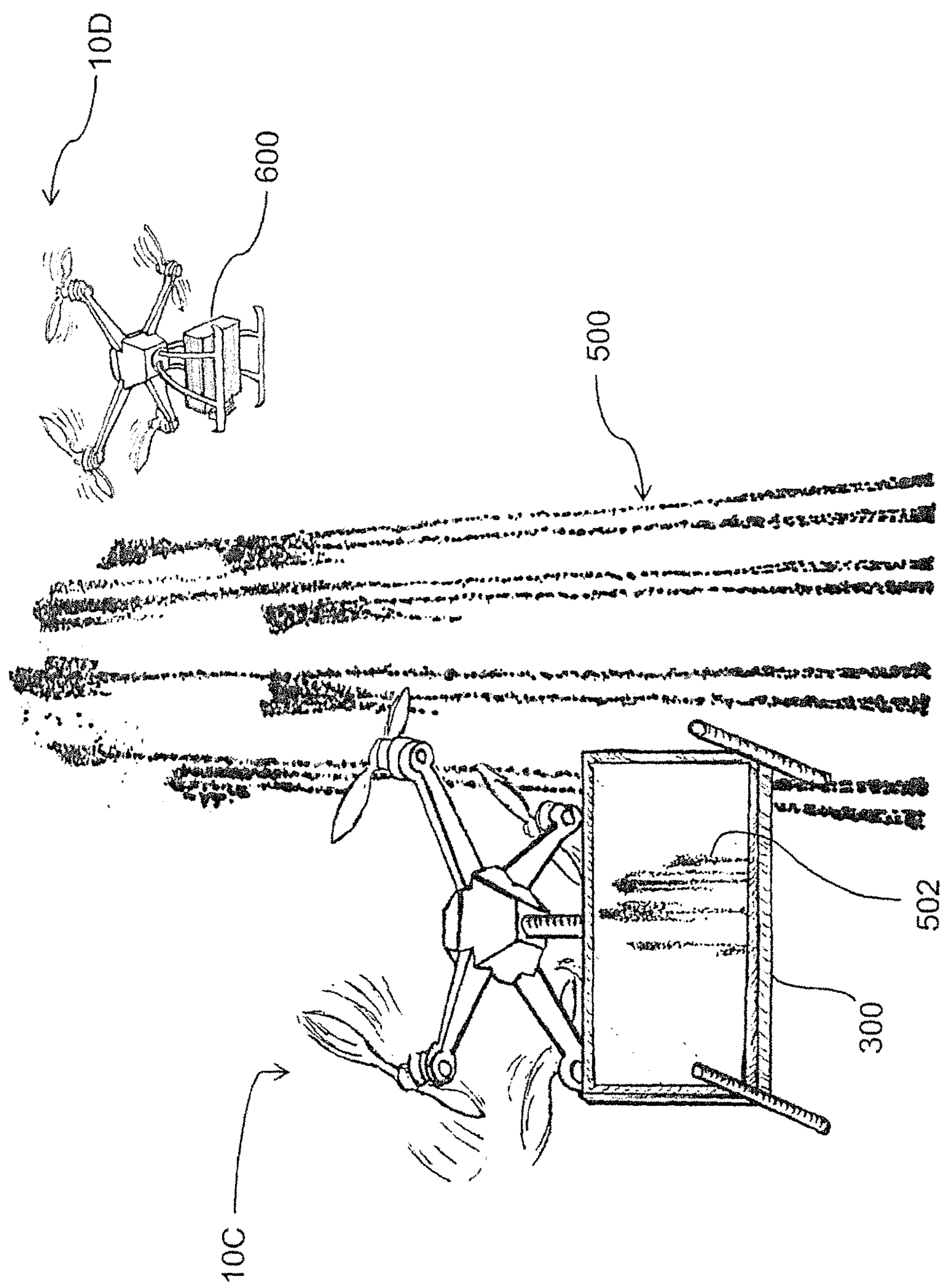
FIG. 14 shows a water display, a UAS configured with a display, and a UAS configured with a camera.

In another embodiment of the current invention as depicted in FIG. 14, UAS 10C may be configured with display 300 and UAS 10D may be configured with camera 600. UAS 10D may also be configured with a transmitter (not shown) and UAS 10C may be configured with a receiver (not shown) such that images or video taken by camera 600 may be transmitted to receiver and be displayed on display 300. In one example that shows a benefit of this configuration, UAS 10D may capture images or video from vantage points of water display 500, such as image or video 502, that may not be viewable by some or all of the audience below, and may transmit these images or video 502 to UAS 10C. UAS 10C may be positioned so that display 300 may be viewable by the audience and may display the received images or video upon display 300 for the audience to enjoy. It should be noted that UAS 10D may transmit images or video captured by camera 600 to one UAS 10C or to multiple UASs 10C that may be configured with one or more displays 300.

In addition, UAS 10D may be configured with multiple cameras 600 that may capture and transmit images or video to one or more displays 300 that may be configured with one or more UASs 10D. Each camera 600 may capture and transmit images or video to the same display 300 or to the same group of displays 300, or may capture and transmit images or video to different displays 100. It logically follows that UAS 10 may be configured with one or more displays 300 that may receive and display images or video received from one or more cameras 600 configured with one or more UASs 10.

It should be noted that display 300 depicted in FIG. 14 may include one or more displays 300 that may be configured and utilized in any of the general configurations as described in relation to FIGS. 5, 6A and 6B and similar embodiments, and may or may not include frames or supports as described. Also, display 300 may comprise flexible display 400. In this scenario, UAS 10 may be configured with any number of displays 400 with any number of sides, and any number of cameras 600, and that any number of cameras 600 may relay images or video to any number of sides of any number of displays 400 to display for audience members to view.

In all of the embodiments of the current invention as described above, UAS 10, 10A, 10B, 10C, 10D may include a tether (not shown) that may supply power, data, commands, diagnostics and other information to and from UAS 10, 10A, 10B, 10C, 10D and any payloads or other systems that it may include. This may allow the elimination of an onboard power supply thus greatly reducing the overall weight of UAS 10, 10A, 10B, 10C, 10D. In turn, this weight reduction may allow UAS 10, 10A, 10B, 10C, 10D to be configured with larger and heavier payloads and still have sufficient power to stay aloft. The tether may also provide movement commands and physical movement control of UAS 10, 10A, 10B, 10C, 10D that may allow the elimination of an onboard flight command system thus further reducing the overall weight of the craft as well as the complexity of its systems. Also, by physically controlling the position and movement of UAS 10, 10A, 10B, 10C, 10D via a tether, UAS 10, 10A, 10B, 10C, 10D may be an "off the shelf" craft such that there is no need for the development of a specialized craft. This will in turn reduce the overall cost of UAS 10, 10A, 10B, 10C, 10D.

Figure 15:
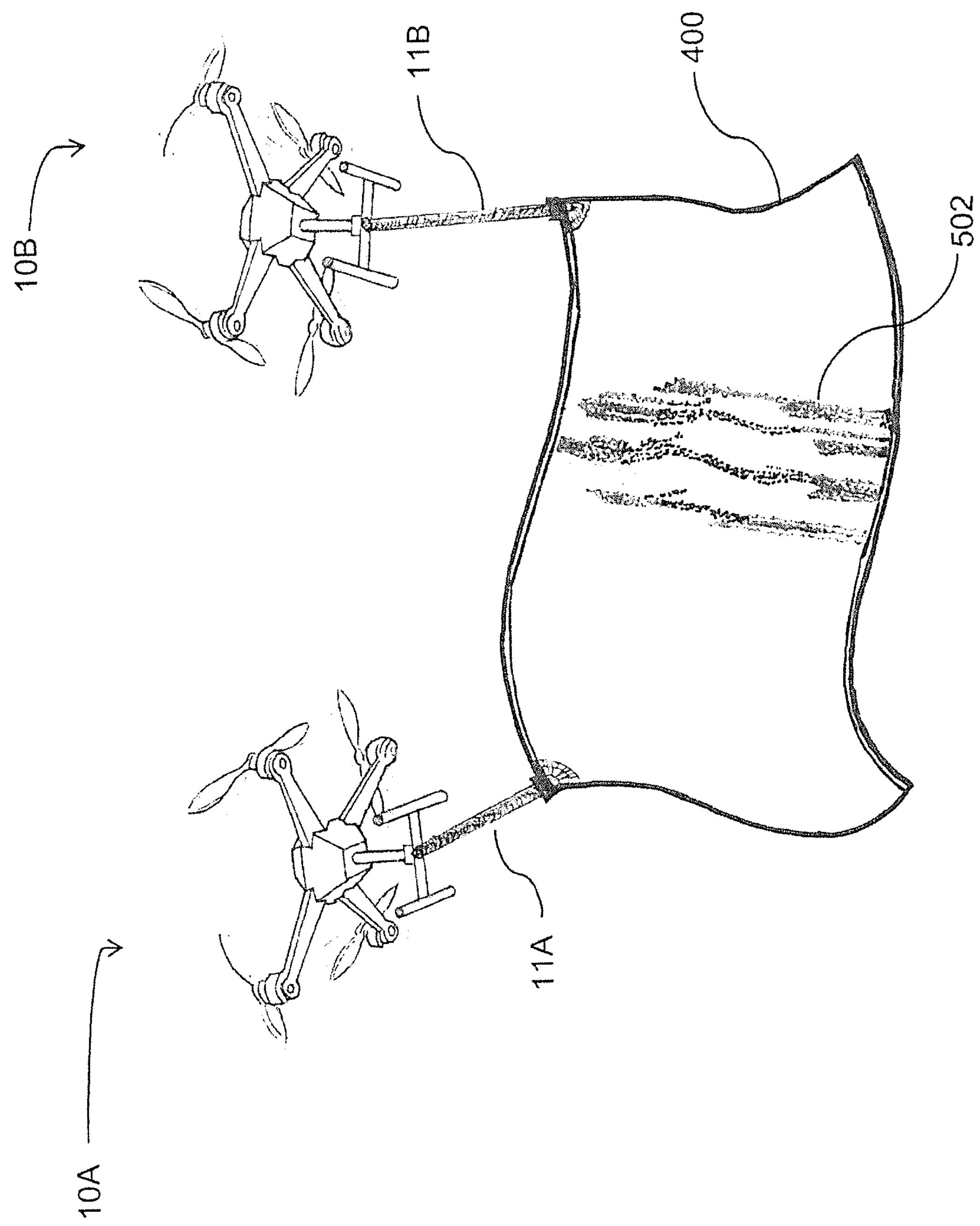
FIG. 15 shows multiple UASs transporting a flexible display.

Another embodiment of the current invention is now described with reference to FIG. 15. This embodiment may include flexible screen 400 that may be held aloft by UASs 10A, 10B via supports 11A, 11B. Flexible screen 400 may comprise graphene. As shown by the curvature of graphene screen 400 in FIG. 15, its flexibility may allow it to deform due to wind, due to one of UASs 10A, 10B flying faster and/or in a different direction than the other, and/or due to other flight conditions. Graphene screen 400 also provides that the image 502 displayed may continue to be displayed even though screen 400 may be deformed.

Graphene screen 400 may have an image transmitted to it for display. For example, an image may be transmitted from either or both of UASs 10A, 10B through supports 11A, 11B which may also function as a hard-wired connection(s) to graphene screen 400. This may occur when UASs 10A, 10B are fitted with cameras as shown in the other embodiments, and it is desired to display the up-in-the-air viewpoint in real time. Alternatively, an image may be wirelessly transmitted from the ground or from some other location to screen 400 for display.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. An unmanned aerial display, comprising:

one or more unmanned aerial systems (UASs), each UAS having one or more propellers; and a flexible electronic display comprising graphene that is connected to the one or more UASs, that is deformable where wind exists and that is configured to display an image, video or other visual effect; and one or more additional UAS(s), each additional UAS having one or more propellers and each additional UAS supporting the flexible electronic display;

wherein the flexible electronic display is configured to deform to accommodate the UASs flying at different speeds while avoiding contact with the one or more propellers;

wherein one of the UASs includes a camera and transmits an image, video or other visual effect to display the image, video or visual effect on the electronic display.

2. The unmanned aerial display of claim 1, wherein the electronic display is configured so that the image, video or other visual effect is viewable from more than one observation location.

3. The unmanned aerial display of claim 2, wherein the flexible electronic display is configured to have a cylindrical, square, rectangular or triangular cross-section.

4. The unmanned aerial display of claim 1, wherein the one or more UASs are in proximity to a water display and wherein an image or video of the water display is displayed on the flexible electronic display.

5. A water display, comprising:

one or more streams of water; and an unmanned aerial system (UAS) that is controlled to fly in proximity to the one or more streams of water and that includes an electronic display which is positioned to be viewable by observers of the display and which displays an image or video which is synchronized with the one or more streams of water;

wherein the image or video becomes brighter as one of the one or more water streams becomes taller.

6. The water display of claim 5, further comprising one or more additional UAS(s) that are controlled to fly in proximity to the one or more streams of water and that each include an electronic display which are positioned to be viewable by observers of the display and which display an image or video which is synchronized with the one or more streams of water.

7. The water display of claim 6, wherein one of the UASs includes a camera and transmits an image, video or other visual effect to another UAS to display the image, video or visual effect on that UAS's electronic display in synchronicity with the one or more streams of water.

8. The water display of claim 5, wherein the electronic display includes graphene.

9. The water display of claim 5, further comprising a camera mounted to the UAS, and wherein the camera provides an image, video or other visual effect to the electronic display for display by the electronic display in synchronicity with the one or more streams of water.

10. The water display of claim 9, wherein the UAS is flown in proximity to the water and wherein an image or video of the water is captured by the camera and displayed on the electronic display.

11. The unmanned aerial display of claim 3, wherein the UAS is flown in proximity to a water display and wherein an image or video of the water display is captured by the camera and displayed on the electronic display.

12. The unmanned aerial display of claim 1, wherein the electronic display includes one or more surfaces configured to display the image, video or other visual effect.

13. The water display of claim 5, wherein the electronic display includes one or more surfaces configured to display the image, video or other visual effect.

14. The unmanned aerial display of claim 1, wherein the electronic display includes an electronic graphene display.

15. The water display of claim 5, wherein the electronic display includes an electronic graphene display.

16. The water display of claim 5, further comprising one or more lights, and wherein the image or video displayed on the electronic display is synchronized with the one or more lights.

17. The water display of claim 16, wherein the image or video displayed on the electronic display becomes brighter as one or more of the lights become brighter; or wherein the color(s) of the image or video displayed on the electronic display match the color(s) of one or more of the lights.

18. An unmanned aerial display, comprising:

a plurality of unmanned aerial systems (UASs), each having one or more propellers; and a flexible electronic display including graphene that is connected to two or more of the plurality of UASs, and that is deformable where wind exists or to accommodate the two or more UASs flying at different speeds, and that is configured to display an image, video or other visual effect;

wherein one or more of the UASs includes a camera and transmits an image, video or other visual effect for display on the flexible electronic display.

19. The unmanned aerial display of claim 18, wherein the plurality of UASs are in proximity to a water display.

20. The unmanned aerial display of claim 19, wherein an image or video of at least a part of the water display is displayed on the flexible electronic display.

* * * * *